United States Patent
Hsu (10) Patent No.: US 10,341,600 B2
(45) Date of Patent: Jul. 2, 2019

(54) CIRCUIT APPLIED TO TELEVISION AND ASSOCIATED IMAGE DISPLAY METHOD

(71) Applicant: MStar Semiconductor, Inc., Hsinchu Hsien (TW)

(72) Inventor: Wei-Yang Hsu, Hsinchu County (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 0 days.

(21) Appl. No.: 15/399,094

(22) Filed: Jan. 5, 2017

(65) Prior Publication Data

US 2018/0035071 A1 Feb. 1, 2018

(30) Foreign Application Priority Data

Aug. 1, 2016 (TW) .............................. 105124275 A (51) Int. Cl.
| | |
|---|---|
| *H04N 5/50* | (2006.01) |
| *H04N 5/44* | (2011.01) |
| *H04N 7/01* | (2006.01) |
| *H04N 21/426* | (2011.01) |
| *H04N 21/431* | (2011.01) |
| *H04N 21/438* | (2011.01) |
| *H04N 21/44* | (2011.01) |

(52) U.S. Cl.
CPC .............. *H04N 5/50* (2013.01); *H04N 5/4401* (2013.01); *H04N 7/0122* (2013.01); *H04N 21/42653* (2013.01); *H04N 21/431* (2013.01); *H04N 21/4384* (2013.01); *H04N 21/44004* (2013.01); *H04N 21/44016* (2013.01)

(58) Field of Classification Search
None
See application file for complete search history.

(56) References Cited

U.S. PATENT DOCUMENTS

| | | | | |
|---|---|---|---|---|
| 2014/0314391 A1* | 10/2014 | Kim | ........................ | G11B 27/11 386/248 |
| 2015/0058893 A1* | 2/2015 | Hong | .................... | G06F 3/0346 725/47 |

FOREIGN PATENT DOCUMENTS

| | | |
|---|---|---|
| TW | 200740228 | 10/2007 |
| TW | 201039638 | 11/2010 |

* cited by examiner

*Primary Examiner* — Samira Monshi
(74) *Attorney, Agent, or Firm* — McClure, Qualey & Rodack, LLP (57) ABSTRACT

A circuit applied to a television is provided. The television includes a memory and a display panel. The circuit includes an image processing circuit, a control circuit, an image capturing circuit and an output circuit. The image processing circuit processes image data to generate processed image data. The control circuit generates a control signal according to a switch signal. According to the control signal, the image capturing circuit captures the processed image data as predetermined image data and stores the predetermined image data to the memory. The output circuit transmits the predetermined image data to the display panel according to the control signal.

10 Claims, 7 Drawing Sheets

CIRCUIT APPLIED TO TELEVISION AND ASSOCIATED IMAGE DISPLAY METHOD

This application claims the benefit of Taiwan application Serial No. 105124275, filed Aug. 1, 2016, the subject matter of which is incorporated herein by reference.

BACKGROUND OF THE INVENTION

Field of the Invention

The invention relates in general to a display device, and more particularly to an image display method applied to a television and an associated circuit.

Description of the Related Art

When a user switches the channel or switches the resolution of an image on a current television, there is an interval in which the television displays an all-black image, causing a sense of an interrupted image display and affecting the comfort of the user viewing the television. For some image signals in a compressed format, one complete image can only be obtained after receiving and decoding a plurality of frames. Thus, before obtaining a complete image from a decoding process, an image processing circuit needs to suspend a process of transmitting processed image data to a display panel, so as to prevent inappropriate image data from being displayed on the display panel. As such, the display data of the display panel is interrupted, hence resulting in the so-called black image in the prior art.

SUMMARY OF THE INVENTION

It is an object of the present invention to provide an image display method capable of continuously displaying display images without any black image when a user switches the channel or the resolution of an image to overcome issues of the prior art.

A circuit applied to a television is disclosed according to an embodiment of the present invention. The television includes a memory and a display panel. The circuit includes an image processing circuit, a control circuit, an image capturing circuit and an output circuit. The image processing circuit process image data to generate processed image data. The control circuit generates a control signal according to a switch signal. The image capturing circuit captures the image data as predetermined image data according to the control signal, and stores the predetermined image data to the memory. The output circuit transmits the predetermined image data to the display panel according to the control signal.

An image processing method applied to a television is disclosed according to another embodiment of the present invention. The television includes a memory and a display panel. The image processing method includes: processing image data to generate processed image data; generating a control signal according to a switch signal; capturing the processed image data as predetermined image data according to the control signal, and storing the predetermined image data to the memory; and transmitting the predetermined imaged data to the display panel according to the control signal.

A circuit applied to a television is further disclosed according to another embodiment of the present invention. The television includes a first memory, a second memory and a display panel. The circuit includes an image processing circuit, a control circuit, a data duplicating circuit and an output circuit. The image processing circuit processes image data to generate processed image data. The control circuit generates a control signal according to a resolution switching signal. The data duplicating circuit duplicates an interface image stored in the first memory to the second memory according to the control signal. The output circuit superimposes the interface image stored in the second memory onto the processed image data, and transmits the superimposed interface image and processed image data to the display panel according to the control signal.

An image processing method applied to a television is further disclosed according to another embodiment of the present invention. The television includes a first memory, a second memory and a display panel. The image processing method includes: processing image data to generate process image data; generating a control signal according to a resolution switching signal; duplicating an interface image stored in the first memory to the second memory according to the control signal; and superimposing the interface image stored in the second memory onto the processed image data, and transmitting the superimposed interface image and processed image data to the display panel according to the control signal.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
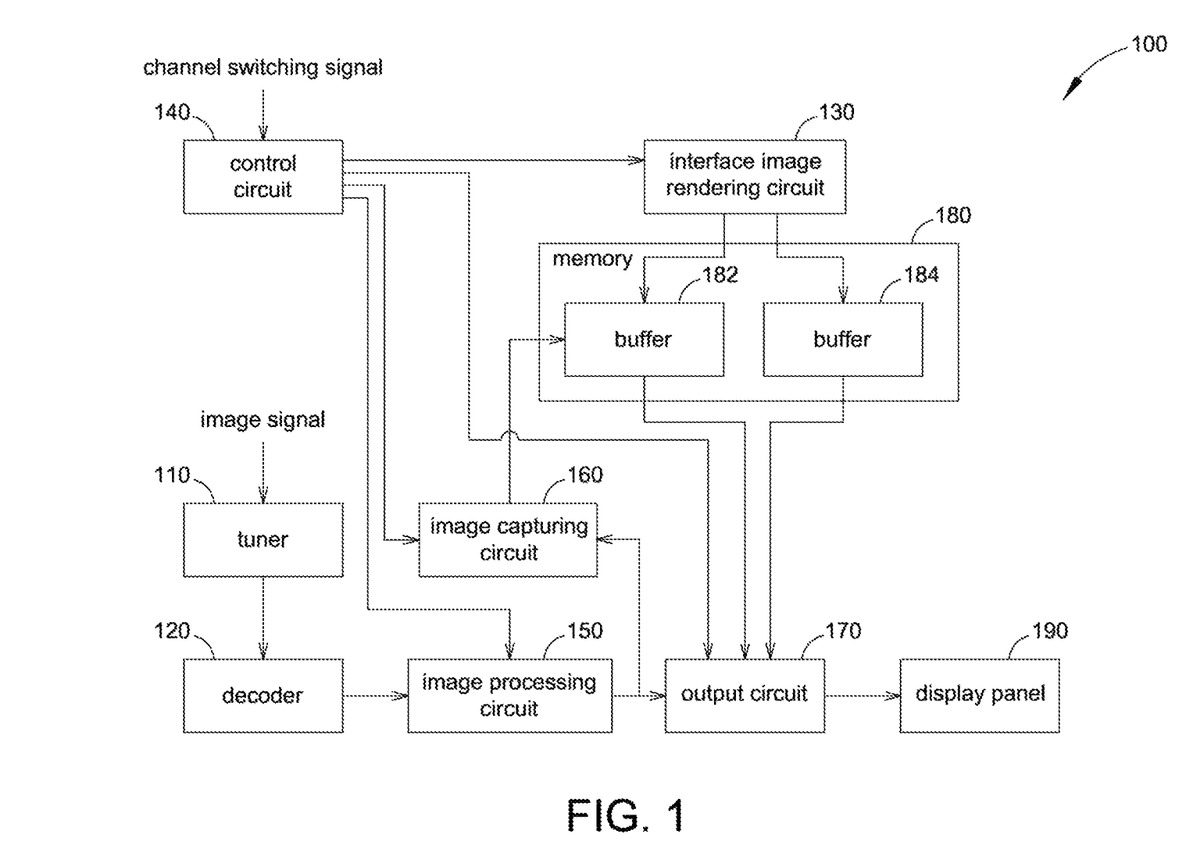
FIG. 1 is a block diagram of a television according to an embodiment of the present invention.

FIG. 1 shows a block diagram of a television 100 according to an embodiment of the present invention. As shown in FIG. 1, the television 100 includes a tuner 110, a decoder 120, an interface image rendering circuit 130, a control circuit 140, an image processing circuit 150, an image capturing circuit 160, an output circuit 170, a memory 180 and a display panel 190. In the embodiment, the memory 180 may be a dynamic random access memory (DRAM), and include two buffers 182 and 184, and the interface image rendering circuit 130 alternately stores new interface images into the buffers 182 and 184 in turn.

Regarding basic operations of the television 100, the tuner 110 first selects a predetermined channel from an image signal received by the television 100 according to a user-determined channel selection signal, and transmits an image signal corresponding to the predetermined channel to the decoder 120. The decoder 120 decodes the image signal corresponding to the predetermined channel to output image data. The image processing circuit 150 performs processes such as scaling, color/brightness adjustment and noise reduction on the received image data to generate processed image data that is then forwarded to the output circuit 170. Meanwhile, the interface image rendering circuit 130 generates an interface image, and stores the interface image to the buffer 182 or the buffer 184. For example, the interface image may be image contents associated with as a table, subtitles, a user interface or an on-screen display (OSD). The output circuit 170 reads the interface image from the buffer 182 or the buffer 184, superimposes the interface image onto the processed image data outputted from the image processing circuit 150, and transmits the superimposed interface image and processed image data to the display panel 190 for display.

In one embodiment of the present invention, the television 100 may further include a multiplexer coupled between the decoder 120 and the image processing circuit 150. The multiplexer transmits one of multiple sets of image data to the image processing circuit 150 according to a user setting. For example, the multiplexer may receive image data from other sources, e.g., analog television image data, High-Definition Multimedia Interface (HDMI) or Digital Visual Interface (DVI) image data, digital television image data, or image data of other specifications/sources. In this embodiment, the multiplexer outputs the image data from the decoder 120 to the image processing circuit 150.

When a user switches the channel, it means that the tuner 110 and the decoder 120 need to generate image data of one additional channel to the image processing unit 150. At this point, to prevent inappropriate image data from being outputted to the display panel 190, the image processing circuit 150 shuts down an image data output path therein. However, this causes an interrupt of display data of the display panel 190, leading to a black image as in the prior art, for example. To solve the issue, through operations of the control circuit 140, the image capturing circuit 160 and the output circuit 170 of the embodiment, the display panel 190 is enabled to continue displaying an image when the channel is switched, thereby enhancing user experiences. Details of the embodiment are given below.

When the user switches the channel, the control circuit 140 generates a control signal to the image capturing circuit 160 and the output circuit 170 according to a channel switching signal. The image capturing circuit 160 captures the processed image data from the image processing circuit 150 as predetermined image data (a predetermined image frame) according to the control signal, and stores the predetermined image data to the buffer 182 or the buffer 184 of the memory 180 (to the buffer 182 in this embodiment). In another embodiment of the present invention, the predetermined image data may also be image data currently being processed by the image processing circuit 150. After the predetermined image data is stored to the buffer 182 of the memory 180, the interface image rendering circuit 130 superimposes the interface image onto the predetermined image data through modifying a part of the contents of the predetermined image data stored in the buffer 182. In other words, through the operations of the interface image rendering circuit 130, the image contents stored in the buffer 182 are substantially the image data displayed on the display panel 190 right before the channel switching signal takes effect. Next, the output circuit 170 continuously reads the predetermined image data superimposed with the interface image from the buffer 182 of the memory 180, and continuously transmits the predetermined image data superimposed with the interface image to the display panel 190, such that the display panel 190 may continue displaying the image data.

Further, only after the system has designated the next channel, and the decoder 120 is reset and has become capable of normally transmitting complete image data to the image processing circuit 150, the output circuit 170 then stops reading the predetermined image data from the buffer 182 and stops transmitting the predetermined image data to the display panel 190, and the predetermined image data in the buffer 182 of the memory 180 is erased.

In another embodiment, the interface image rendering circuit 130 is not required to modify the predetermined image data stored in the buffer 182; that is, the interface image rendering circuit 130 need not superimpose the interface image onto the predetermined image data. At this point, the output circuit 170 directly reads the predetermined image data from the buffer 182 and transmits the predetermined image data to the display panel 190 for display.

In the embodiment, the output circuit 170 may be implemented by a superimposing circuit. Thus, even if the image processing circuit 150 does not shut down its image data output path in time, the output circuit 170 nonetheless superimposes the predetermined image data read from the memory 180 onto the image data outputted from the image processing circuit 150. As such, the predetermined image data may still be continuously transmitted to the display panel 190 for display, and so the issue of a black image of the prior art is eliminated.

In another embodiment of the present invention, the control circuit 140 generates a control signal to the image processing circuit 150 according to the channel switching signal to control the image processing circuit 150 to stop generating the processed image data.

Figure 2:
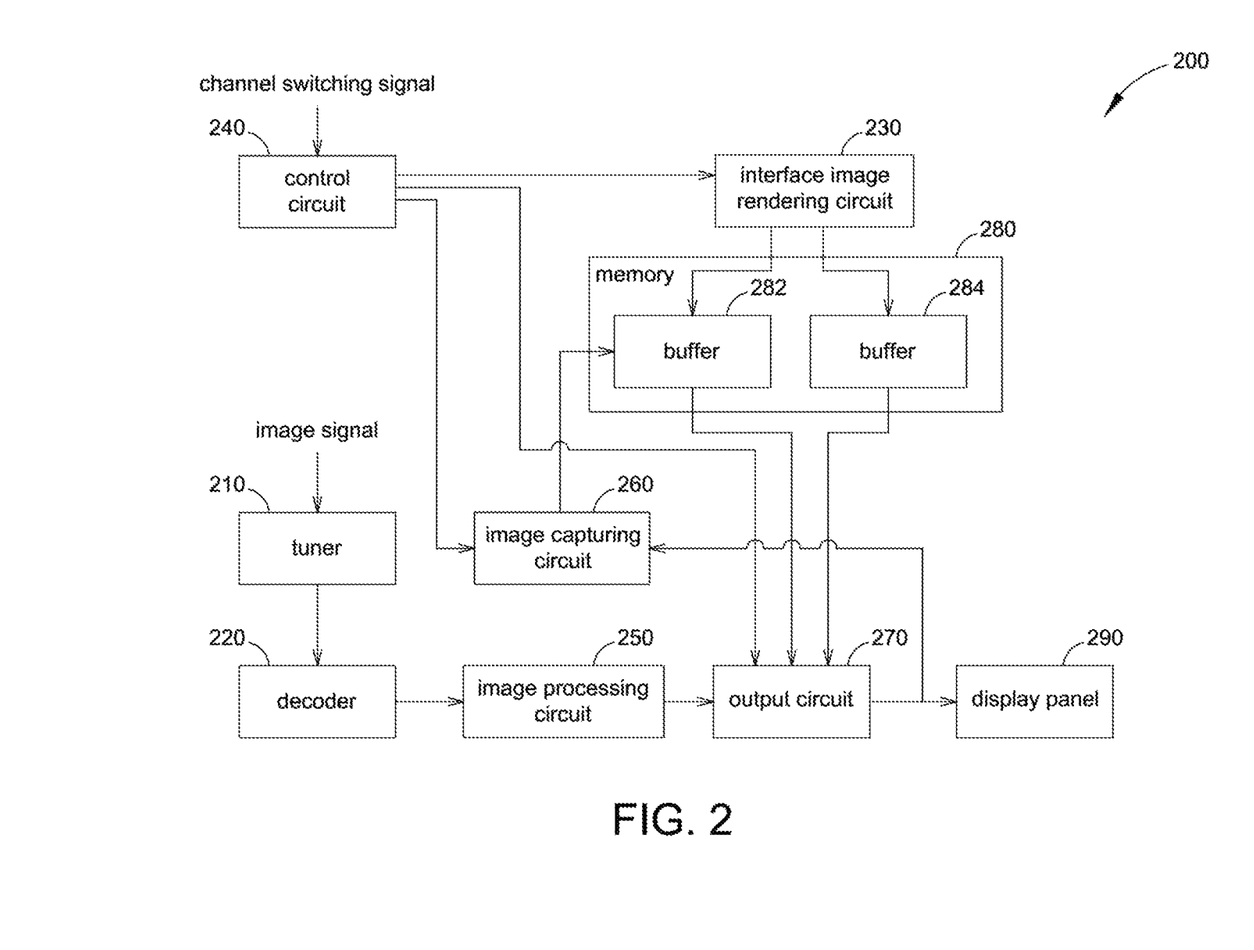
FIG. 2 is a block diagram of a television according to another embodiment of the present invention.

FIG. 2 shows a block diagram of a television 200 according to another embodiment of the present invention. As shown in FIG. 2, the television 200 includes a tuner 210, a decoder 220, an interface image rendering circuit 230, a control circuit 240, an image processing circuit 250, an image capturing circuit 260, an output circuit 270, a memory 280 and a display panel 290. The memory 280 includes buffers 282 and 284. The circuits in FIG. 2 and those in FIG. 1 in the same terms have similar operations and functions. One main difference of the television 200 in FIG. 2 from the television 100 in FIG. 1 is that, the image capturing circuit 260 captures an output image outputted from the output circuit 270 as the predetermined image data (a predetermined image frame) according to the control signal.

In this embodiment, the output circuit 270 may be similarly implemented by a superimposing circuit. That is to say, the output image outputted from the output circuit 270 and captured by the image capturing circuit 260 is originally superimposed with the interface image. Thus, the interface image rendering circuit 230 is not required to modify a part of the contents of the predetermined image data stored in the buffer 282 in order to superimpose the interface image onto the predetermined image data.

Figure 3:
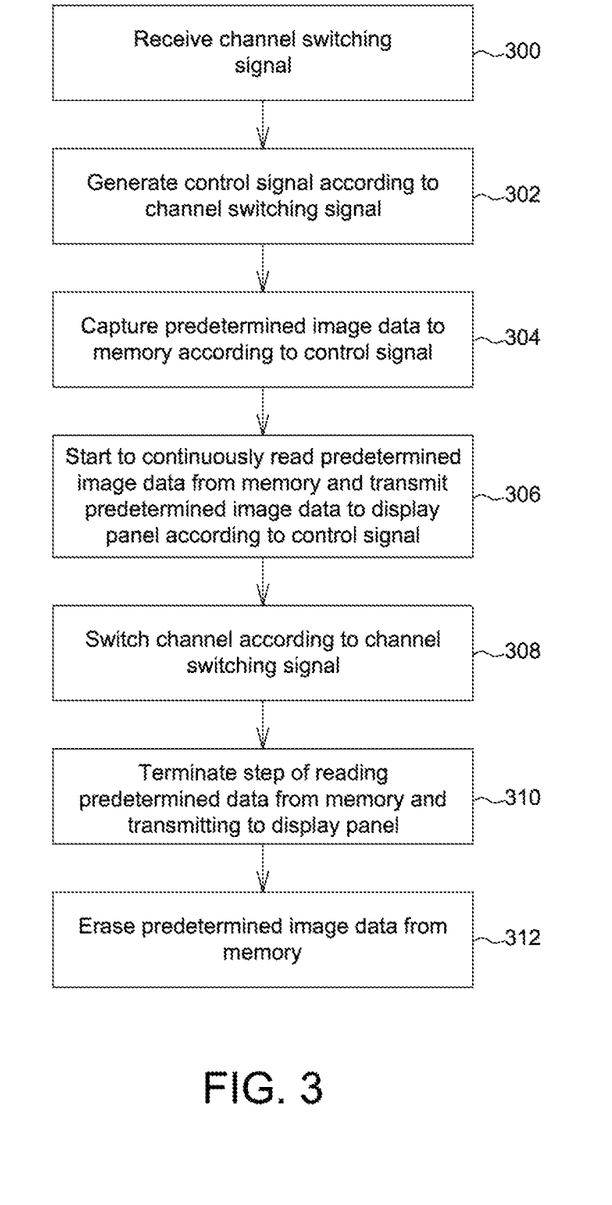
FIG. 3 is a flowchart of an image display method applied to a television according to an embodiment of the present invention.

FIG. 3 shows a flowchart of an image display method applied to a television according to an embodiment of the present invention. Also referring to the description associated with FIG. 1 and FIG. 2, the process of the image display method is described in detail below.

In step 300, a channel switching signal is received.

In step 302, a control signal is generated according to the channel switching signal.

In step 304, predetermined image data is captured to the memory according to the control signal.

In step 306, the predetermined image data is continuously read from the memory according to the control signal, and is continuously transmitted to the display panel.

In step 308, a channel is switched according to the channel switching signal.

In step 310, the step of reading the predetermined image data from the memory and transmitting the predetermined image data to the display panel is terminated.

In step 312, the predetermined image data is erased from the memory.

Figure 4:
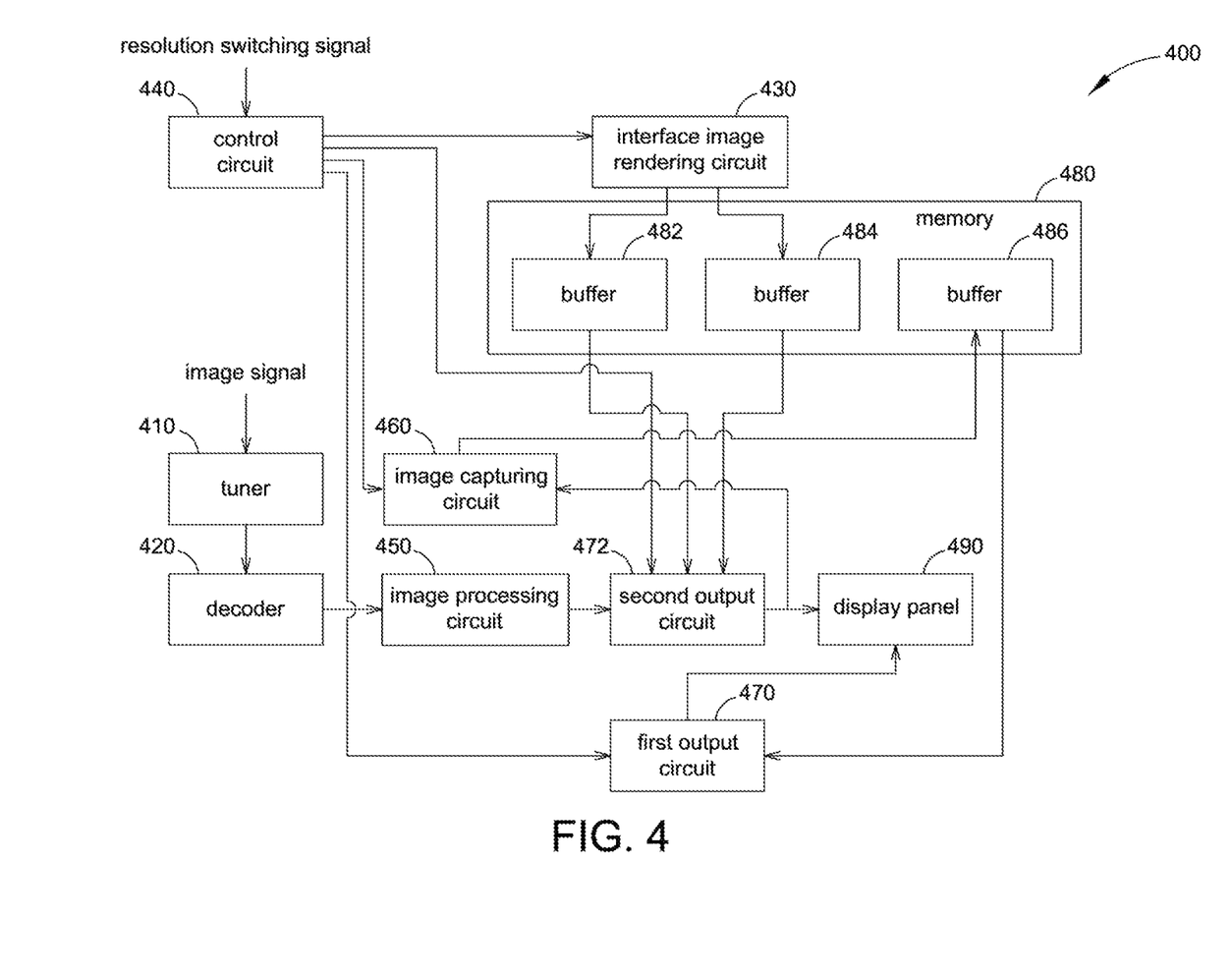
FIG. 4 is a block diagram of a television according to another embodiment of the present invention.

FIG. 4 shows a block diagram of a television 400 according to another embodiment of the present invention. The television 400 includes a tuner 410, a decoder 420, an interface image rendering circuit 430, a control circuit 440, an image processing circuit 450, an image capturing circuit 460, a first output circuit 470, a second output circuit 472, a memory 480 and a display panel 490. In this embodiment, the memory 480 may be a DRAM, and includes three buffers 482, 484 and 486. The interface image rendering circuit 430 alternately stores new interface images to the buffers 482 and 484 in turn.

Regarding basic operations of the television 400, the tuner 410 first selects a predetermined channel from an image signal received by the television according to a user-determined channel selection signal, and transmits an image signal corresponding to the predetermined channel to the decoder 420. The decoder 420 decodes the image signal corresponding to the predetermined channel to output image data. The image processing circuit 450 performs image processing on the received image data to generate processed image data to the second output circuit 472. Meanwhile, the interface image rendering circuit 430 generates an interface image according to a control signal generated by the control circuit 440, and stores the interface image to the buffer 482 or the buffer 484. Next, the second output circuit 470 reads the interface image from the buffer 482 or the buffer 484, superimposes the interface image onto the processed image data outputted from the image processing circuit 450, and transmits the processed image data superimposed with the interface image to the display panel 490 for display.

In one embodiment of the present invention, similar to the embodiment in FIG. 1, the television 400 may further include a multiplexer coupled between the decoder 420 and the image processing circuit 450. Operation details of the multiplexer may be referred from the foregoing description, and shall be omitted herein.

When the user switches the resolution of the interface image provided by the interface image rendering circuit 430, e.g., increasing an original resolution 800*480 to a new resolution 1024*600, because the change in the resolution also causes a change in the memory space for storing the interface image, the buffers 482 and 484 corresponding to the changed resolution need to be again allotted in the memory 480 before the interface image rendering circuit 430 stores the new interface image into the buffer 482 or the buffer 484. Next, the second output circuit 472 reads the new interface image from the buffer 482 or the buffer 484, superimposes the new interface image onto the predetermined image data outputted from the image processing circuit 450, and transmits the predetermined image data superimposed with new interface image to the display panel 490 for display. However, during the process of allotting the buffers 482 and 484 in the memory 480 in response to the changed resolution, the second output circuit 472 is unable to read any interface image from the memory 480. In practice, the second output circuit 472 also needs to again set associated parameters corresponding to the newly allotted buffers 482 and 484, and the display panel 490 at this point may display an incorrect image or a black image. Therefore, after receiving the resolution switching signal, the control circuit 440 generates a control signal to the image capturing circuit 460 to capture processed image data from the second output circuit 472 as predetermined image data (a predetermined image frame), and stores the predetermined image data to the buffer 486 in the memory 480. The second output circuit 472 then stops superimposing the interface image from the buffer 482 or 484 onto the processed image data and stops transmitting the processed image data superimposed with the interface image to the display panel 490, and the first output circuit 470 reads the predetermined image data from the buffer 486 according to the control signal, and transmits the predetermined image data to the display panel 490 for display. In other words, during the process of switching the resolution, by continuously outputting the predetermined image data using the first output circuit 470, the display panel 490 is enabled to continuously display the predetermined image data without causing the issue of a black image of the prior art.

Further, only when the new interface image is completely written into the memory 480 and may be read by the second output circuit 472, the first output circuit 470 then stops reading the predetermined image data from the buffer 486 and stops transmitting the predetermined image data to the display panel 490, and the predetermined image data in the buffer 486 of the memory 480 is erased. At this point, the second output circuit 472 continues reading the new interface image from the buffer 482 or 484, superimposes the new interface image onto the processed image data outputted from the image processing circuit 450, and transmits the processed image data superimposed with new interface image to the display panel 490 for display.

In this embodiment, the first output circuit 470 and the second output circuit 472 may each be implemented by a superimposing circuit, and the first output circuit 470 is given a higher priority. Thus, even if the second output circuit 472 is not turned off in time, the display panel 490 may still display contents transmitted from the first output circuit 470.

Figure 5:
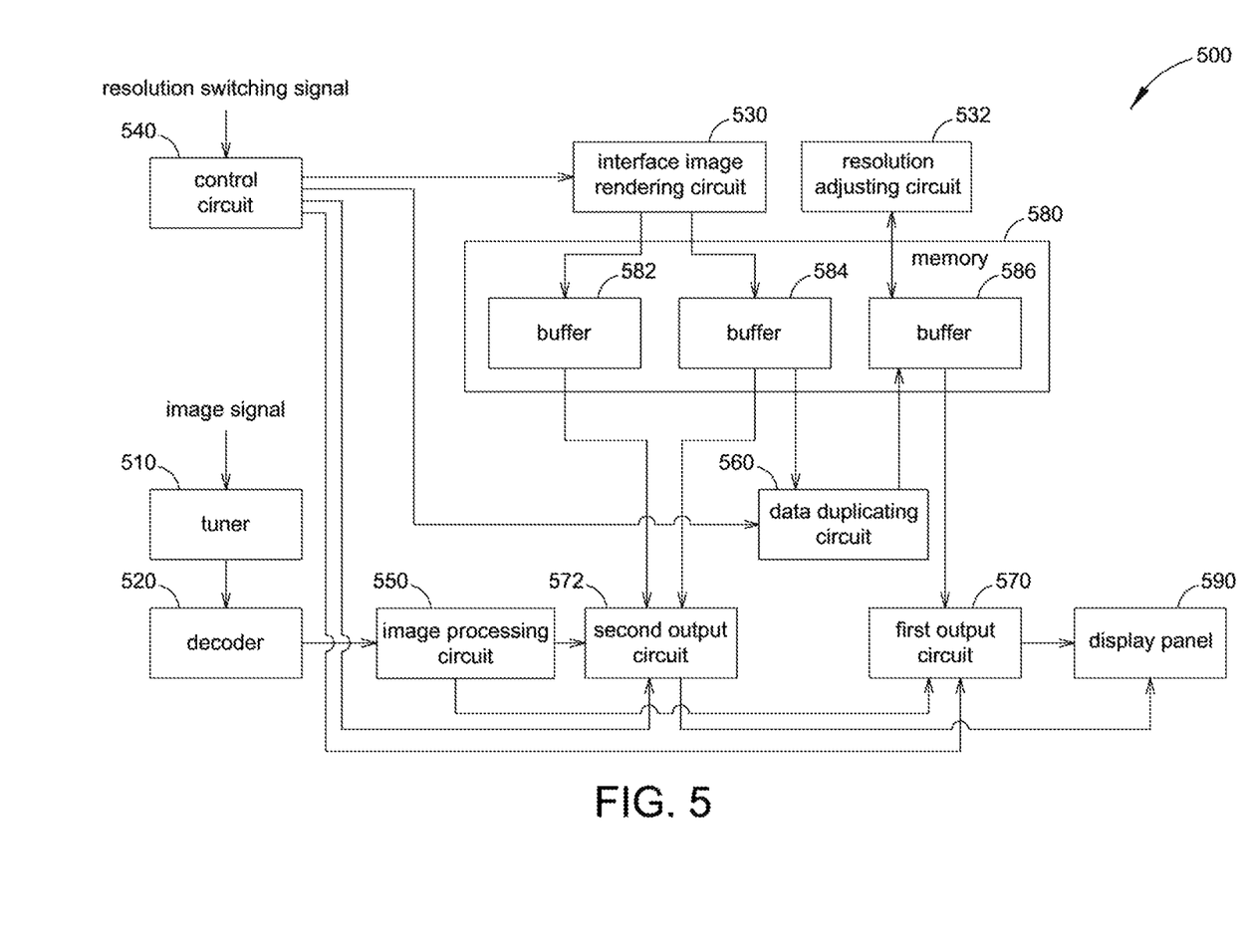
FIG. 5 is a block diagram of a television according to another embodiment of the present invention.

FIG. 5 shows a block diagram of a television 500 according to an embodiment of the present invention. As shown in FIG. 5, the television 500 includes a tuner 510, a decoder 520, an interface image rendering circuit 530, a resolution adjusting circuit 532, a control circuit 540, an image processing circuit 550, an image duplicating circuit 560, a first output circuit 570, a second output circuit 572, a memory 580 and a display panel 590. The memory 580 includes buffers 582, 584 and 586.

The circuits in FIG. 5 and those in FIG. 4 in the same terms have similar operations and functions. Some main differences of the television 500 in FIG. 5 from the television 400 in FIG. 4 are the image duplicating circuit 560 and the first output circuit 570. When the user switches the resolution, the television 500 first generates a control signal through the control circuit 540 according to the resolution switching signal. However, instead of capturing the predetermined image data using the image capturing circuit as shown in FIG. 4, the television 500 duplicates the interface image (an interface image before the resolution is changed) stored in the buffer 584 to the buffer 586 according to the control signal. Next, the second output circuit 572 stops superimposing the interface image from the buffer 582 or the buffer 584 onto the processed image data and stops transmitting the processed image data superimposed with interface image to the display panel 590. Further, the first output circuit 570 reads the duplicated interface image from the buffer 586 according to the control signal, superimposes the duplicated interface image onto the processed image data outputted from the image processing circuit 550, and transmits the processed image data superimposed with the duplicated interface image to the display panel 590 for display. In other words, during the process of switching the resolution of the interface image, the duplicated interface image is continuously superimposed onto the processed image data and transmitted to the display panel 590 by using the first output circuit 570, and the second output circuit 572 stops outputting data to the display panel 590, thereby solving the issue of black image of the prior art.

Further, only after the new interface image is completely written into the memory 580 and may be read by the second output circuit 572, the first output circuit 570 then stops reading the duplicated interface image from the buffer 586 and stops transmitting the processed image data superimposed with the duplicated interface image to the display panel 590, and the predetermined image data in the buffer 586 of the memory 580 is erased. At this point, the second output circuit 572 continues reading the new interface image from the buffer 582 or the buffer 584, superimposed the new interface image onto the processed image data outputted from the image processing circuit 550, and transmits the processed image data superimposed with the new interface image to the display panel 590 for display.

In this embodiment, the first output circuit 570 and the second output circuit 572 may each be implemented by a superimposing circuit, and the first output circuit 570 is given a higher priority. Thus, even if the second output circuit 572 is not turned off in time, the display panel 590 may still display contents transmitted from the first output circuit 570.

In the above embodiment, the interface image stored in the buffer 586 is directly duplicated from the buffer 584; i.e., the interface image stored in the buffer 586 is the interface image before the resolution is changed. In another embodiment of the present invention, the resolution adjusting circuit 532 may adjust the resolution of the interface image stored in the buffer 586 according to the resolution switching signal for the use of the first output circuit 570. Such design modification is encompassed within the scope of the present invention.

Figure 6:
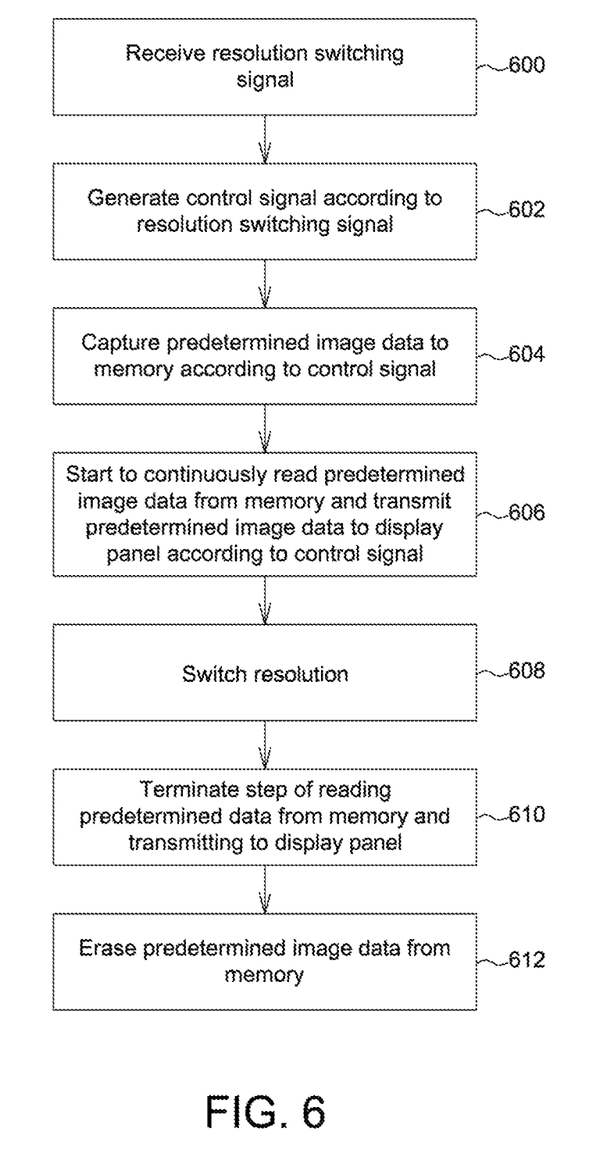
FIG. 6 is a flowchart of an image display method applied to a television according to another embodiment of the present invention.

FIG. 6 shows a flowchart of an image display method according to another embodiment of the present invention. Referring to the description associated with the embodiment in FIG. 4, the process of the image display method includes following steps.

In step 600, a resolution switching signal is received.

In step 602, a control signal is generated according to the resolution switching signal.

In step 604, predetermined image data is captured to the memory according to the control signal.

In step 606, the predetermined image data is continuously read from the memory and transmitted to the display panel according to the control signal.

In step 608, the resolution is switched.

In step 610, the step of reading the predetermined image data from the memory and transmitting the predetermined image data to the display panel is terminated.

In step 612, the predetermined image data is erased from the memory.

Figure 7:
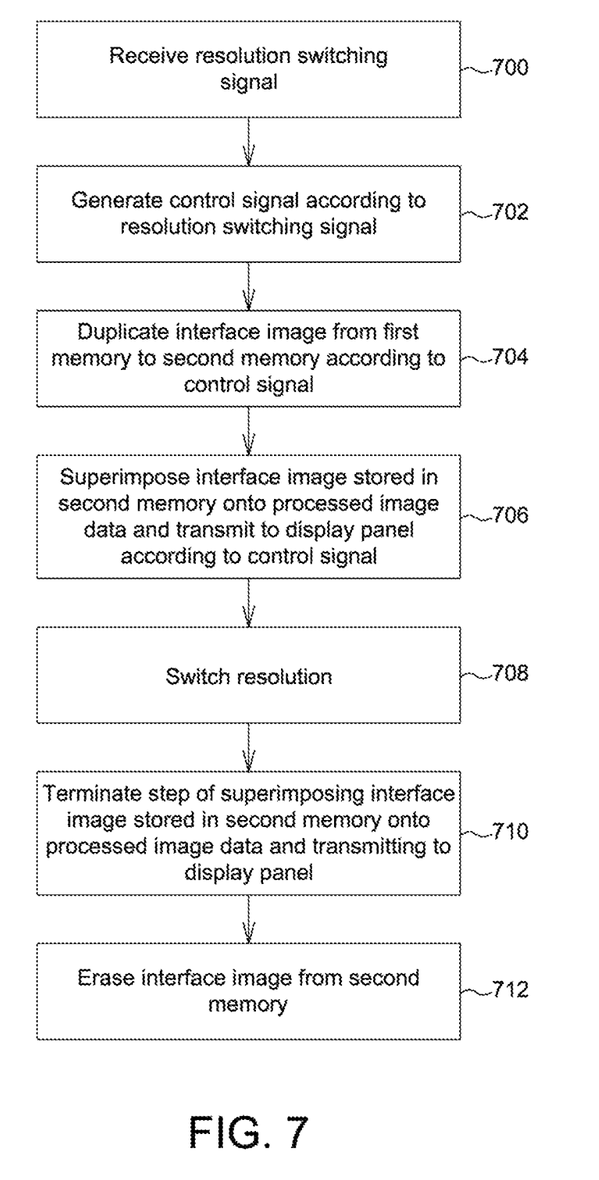
FIG. 7 is a flowchart of an image display method applied to a television according to another embodiment of the present invention.

FIG. 7 shows a flowchart of an image display method according to another embodiment of the present invention. Referring to the description associated with the embodiment in FIG. 5, the process of the image display method includes following steps.

In step 700, a resolution switching signal is received.

In step 702, a control signal is generated according to the resolution switching signal.

In step 704, an interface image is duplicated from a first memory to a second memory according to the control signal.

In step 706, the interface image stored in the second memory is superimposed onto the processed image data and the processed image data superimposed with the interface image is transmitted to the display panel according to the control signal.

In step 708, the resolution is switched.

In step 710, the step of superimposing the interface image stored in the second memory onto the processed image data and transmitting the processed image data superimposed with the interface image is terminated.

In step 712, the interface image is erased from the second memory.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A circuit, applied to a television comprising a memory and a display panel, comprising:
   an image processing circuit, processing image data to generate processed image data, wherein the image processing circuit processes at least one of scaling, color adjustment, brightness adjustment and noise reduction on the image data to generate the processed image data;
   a control circuit, generating a control signal according to a switching signal;
   an image capturing circuit, capturing the processed image data as predetermined image data according to the control signal and storing the predetermined image data to the memory;
   a first output circuit, transmitting the predetermined image data to the display panel according to the control signal; and
   a second output circuit, superimposing an interface image onto the processed image data and transmitting the processed image data superimposed with the interface image to the display panel, and stopping superimposing the interface image onto the processed image data and stopping transmitting the processed image data superimposed with the interface image to the display panel according to the control signal;
   wherein the memory stores the interface image the switch signal contains a resolution switching signal, and the second output circuit further sets a parameter corresponding to the resolution switching signal according to the control signal.

2. The circuit according to claim 1, wherein the television further comprises a tuner, the switch signal containing a channel switching signal, and the tuner outputs the image data according to the channel switching signal.

3. The circuit according to claim 1, further comprising:
an interface image rendering circuit, rendering and superimposing an interface image onto the predetermined image data.

4. The circuit according to claim 1, wherein the image processing circuit further stops generating the processed image data according to the control signal.

5. The circuit according to claim 1, wherein the memory stores an interface image, and the processed image data captured by the image capturing circuit is the processed image data superimposed with the interface image.

6. An image processing method, applied to a television comprising a first output circuit, a second output circuit, a memory, and a display panel, comprising:
processing image data by at least one of scaling, color adjustment, brightness adjustment and noise reduction on the image data to generate processed image data;
generating a control signal according to a switching signal, wherein the switch signal contains a resolution switching signal;
capturing the processed image data as predetermined image data according to the control signal and storing the predetermined image data to the memory;
transmitting, by a first output circuit, the predetermined image data to the display panel according to the control signal;
superimposing, by the second output circuit, an interface image onto the processed image data and transmits the processed image data superimposed with the interface image to the display panel;
controlling the second output circuit to stop superimposing the interface image onto the processed image data and to stop transmitting the processed image data superimposed with the interface image to the display panel according to the control signal; and
setting a parameter, corresponding to the resolution switching signal, of the second output circuit according to the control signal
wherein the memory stores the interface image.

7. The image processing method according to claim 6, wherein the television further comprises a tuner, the switch signal containing a channel switching signal, and the tuner outputs the image data according to the channel switching signal.

8. The image processing method according to claim 6, further comprising:
rendering and superimposing an interface image onto the predetermined image data.

9. The image processing method according to claim 6, further comprising:
stopping generating the processed image data according to the control signal.

10. The image processing method according to claim 6, wherein the memory stores an interface image, and the processed image data captured is the processed image data superimposed with the interface image.

* * * * *